Dec. 6, 1966 D. S. CVACHO ET AL 3,289,554
METHOD AND APPARATUS FOR ROTATING AND/OR AXIALLY
ADVANCING TUBULAR STOCK OR THE LIKE
Filed Nov. 6, 1962 6 Sheets-Sheet 1

INVENTORS
DANIEL S. CVACHO &
BY FIELD I. ROBERTSON JR.
Glenn, Palmer &
Matthews
THEIR ATTORNEYS

United States Patent Office 3,289,554
Patented Dec. 6, 1966

3,289,554
METHOD AND APPARATUS FOR ROTATING AND/OR AXIALLY ADVANCING TUBULAR STOCK OR THE LIKE
Daniel S. Cvacho and Field I. Robertson, Jr., Chesterfield County, Va., assignors to Reynolds Metals Company, Richmond, Va., a corporation of Delaware
Filed Nov. 6, 1962, Ser. No. 235,727
10 Claims. (Cl. 93—80)

This invention relates to an improved method and apparatus for rotating and/or axially advancing tubular stock or the like.

For example, it is well known that composite, helically wound container bodies or the like can be continuously formed by helically winding strips of material onto a mandrel to continuously form tubular body stock that is continuously rotated and axially advanced on the mandrel by suitable means to continuously draw the strips of material onto the mandrel.

One such prior known means for continuously rotating and axially advancing the tubular stock on the mandrel comprises a continuous crossed belt having a portion thereof looped around the tubular body stock whereby the continuous movement of the crossed belt causes the tubular body stock to be rotated and axially advanced relative to the mandrel.

However, it has been found that when certain of the strips of material being helically wound to form the container body stock or the like have adjacent edges of adjacent convolutions thereof disposed in abutting rather than overlapping relation, such prior known crossed belt driving means tends to have surges, whereby the abutting relation is not always obtained and non-uniform container bodies are formed.

Accordingly, it is a feature of this invention to provide an improved method and apparatus for rotating and axially advancing such tubular stock without the adverse effects of the surges of the prior known crossed belt arrangement.

Another feature of this invention is to provide an improved method and apparatus for rotating and axially advancing tubular stock in such a manner that all points or portions of the tubular stock is subjected to lamination pressures to produce a better laminated product than the prior known methods and apparatus.

One embodiment of this invention for accomplishing the above features comprises a plurality of roller means adapted to engage the tubular stock and be rotated to axially advance the tubular stock, the rotating roller means also being orbited to cause rotation of the tubular stock.

Therefore, it is an object of this invention to provide an improved apparatus having one or more of the novel features set forth above or hereinafter shown or described.

Another object of this invention is to provide an improved method having one or more of the novel features set forth above or hereinafter shown or described.

Other objects, uses and advantages of this invention are apparent from a reading of this description, which proceeds with reference to the accompanying drawings showing a part thereof and wherein:

FIGURE 1 is a schematic perspective view illustrating the prior art means for rotating and axially advancing tubular stock or the like.

FIGURE 3 is a schematic perspective view illustrating the method and apparatus of this invention for rotating and axially advancing tubular stock or the like.

While the various features of this invention are hereinafter described and illustrated as being particularly adaptable for rotating and axially advancing container body stock on a mandrel or the like, it is to be understood that the various features of this invention can be utilized singly or in any combination thereof to rotate and/or axially advance other tubular stock or the like.

Therefore, this invention is not to be limited to only the embodiments illustrated in the drawings, because the drawings are merely utilized to illustrate one of the wide variety of uses of this invention.

Figure 1:
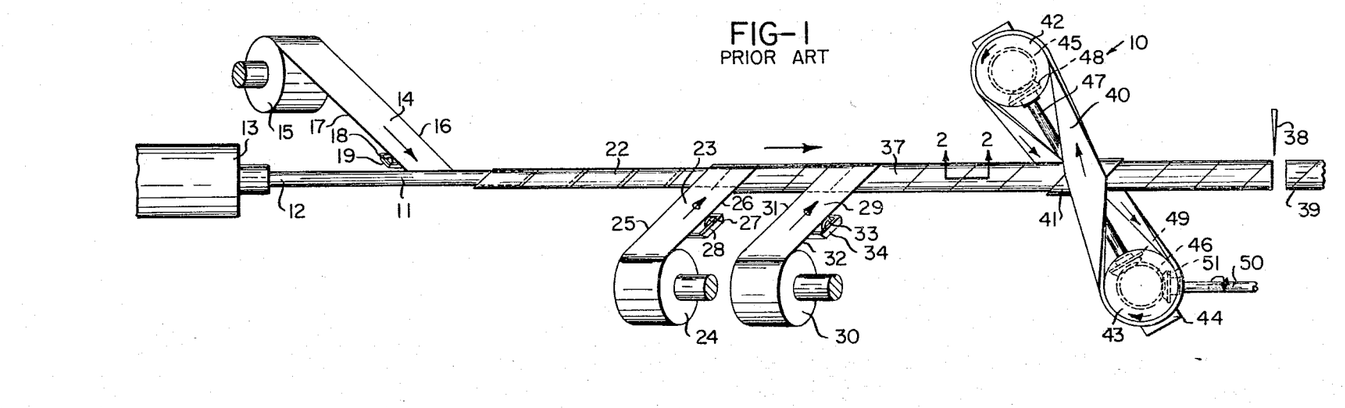

Referring now to FIGURE 1, the prior art method and apparatus for making helically wound container bodies or the like is generally indicated by the reference numeral 10 and will now be described in order to better understand the improvements of this invention.

As illustrated in FIGURE 1, a substantially cylindrical mandrel 11 has one end 12 thereof secured in cantilevered fashion to a supporting structure 13 whereby the other end (not shown) of the mandrel 11 is disposed remote from the supporting structure 13.

A strip of lining material 14 is angularly fed onto the mandrel 11 from a free wheeling supply roll 15 and is adapted to have the opposed edges 16 and 17 thereof disposed in overlapping relation on the mandrel 11, such overlapping edges 16 and 17 being secured together by a suitable adhesive applied to the under surface of the edge 17 by an adhesive applicator roll 18 receiving the adhesive from a reservoir 19 in a conventional manner.

Figure 2:
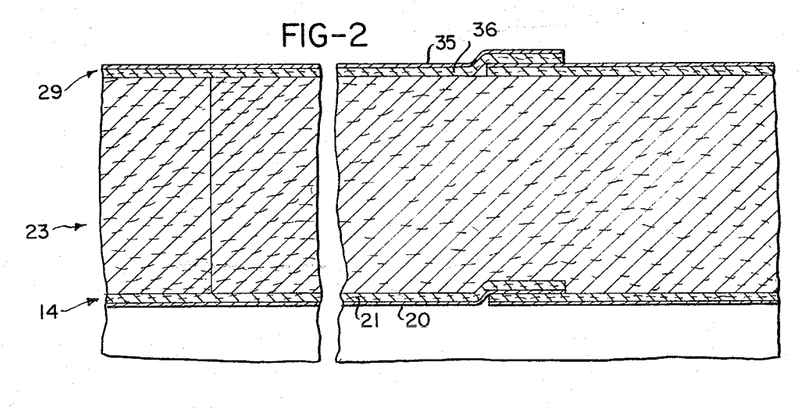
FIGURE 2 is an enlarged, fragmentary, cross-sectional view taken on line 2—2 of FIGURE 1.

While the lining material 14 can comprise any suitable material and be formed in any suitable manner, the embodiment thereof illustrated in the drawings comprises a relatively thin strip of aluminum-containing metallic foil 20, FIGURE 2, laminated by a suitable adhesive to a strip of paper backing material 21.

As the strip of lining material 14 is being continuously drawn onto the mandrel 11, the same forms a lining core 22 that is continuously rotated and axially advanced to the right on the mandrel 11 in a manner hereinafter described to continuously draw the lining material 14 onto the mandrel 11.

Subsequently, one or more strips of paper board material 23 is angularly fed onto the rotating and axially advancing lining core 22 from a free wheeling supply roll 24, each strip of paper board material 23 having the opposed edges 25 and 26 thereof disposed in abutting relation, as illustrated in FIGURE 2, rather than an overlapping relation.

Each strip of paper board material 23 is adapted to be secured to the underlying helically wound strip of material by a suitable layer of adhesive applied to the under surface of the particular strip of material 23 by an adhesive applicator roller 27 receiving the adhesive from a reservoir 28 in a conventional manner.

After the desired body thickness of the helically wound material has been built up by the paper board material 23, a strip of wrapping or labeling material 29 is angularly fed onto the helically wound paper board material 23 and is drawn from a free wheeling supply roll 30.

Preferably, the strip of wrapping material 29 is so helically wound that the opposed edges 31 and 32 thereof are disposed in overlapping relation in the manner illustrated in FIGURE 2, the wrapping material 29 having the entire under surface thereof coated with a suitable adhesive by an applicator roll 33 receiving the adhesive from a reservoir 34 in a conventional manner.

While the labeling or wrapping material 29 can comprise any suitable material and be formed in any suitable manner, the embodiment thereof illustrated in the drawings comprises an outer strip of aluminum-containing foil 35, FIGURE 2, laminated by a suitable adhesive to a strip of paper backing material 36.

The strip of wrapping material 29 completes the container body stock 37, which is continuously rotated and axially advanced to the right on the mandrel 11 in a manner hereinafter described, whereby a suitable cutter means 38 is adapted to cut the rotating and axially advancing tubular stock 37 into individual container bodies 39 or the like, the individual container bodies 39 being adapted to have the opposed ends thereof subsequently closed by suitable end closures in a manner well known in the art.

The prior art means for rotating and axially advancing the tubular stock 37 to the right on the mandrel 11 to continuously draw the strips of material 14, 23 and 29 thereon to continuously form the container body stock 37 is illustrated in FIGURE 1 and comprises a continuous crossed belt 40 having a portion 41 thereof looped around the container body stock 37, whereby continuous movement of the belt 40 in the direction indicated by the arrows causes the container body stock 37 to be continuously rotated and axially advanced to the right on the mandrel 11.

In particular, the crossed belt 40 is looped around a pair of pulleys 42 and 43 respectively rotatably carried by a frame means 44 and having beveled gears 45 and 46 interconnected thereto.

The pulleys 42 and 43 are adapted to be rotated in unison by a common drive shaft 47 having beveled gears 48 and 49 at the opposed ends thereof and respectively disposed in meshing relation with the beveled gears 45 and 46 respectively carried by the pulleys 42 and 43.

A drive shaft 50 carries a beveled gear 51 disposed in meshing relation with the beveled gear 46, whereby rotation of the drive shaft 50 by any suitable means (not shown) in a direction indicated by the arrow causes rotation of the pulleys 42 and 43 in the direction indicated by the arrows to cause the belt 40 to continuously rotate and axially advance the tubular body stock 37 to the right on the mandrel 11.

However, it has been found that the belt 40 has various surges thereof which tend to effect the relation of the abutting edges 25 and 26 of the paper board stock 23 so that the same are not always disposed in abutting relation, as is required to form a uniform container body 39.

According to the teachings of this invention, however, an improved method and apparatus for rotating and axially advancing the tubular stock 37 is provided and will now be described.

Figure 3:
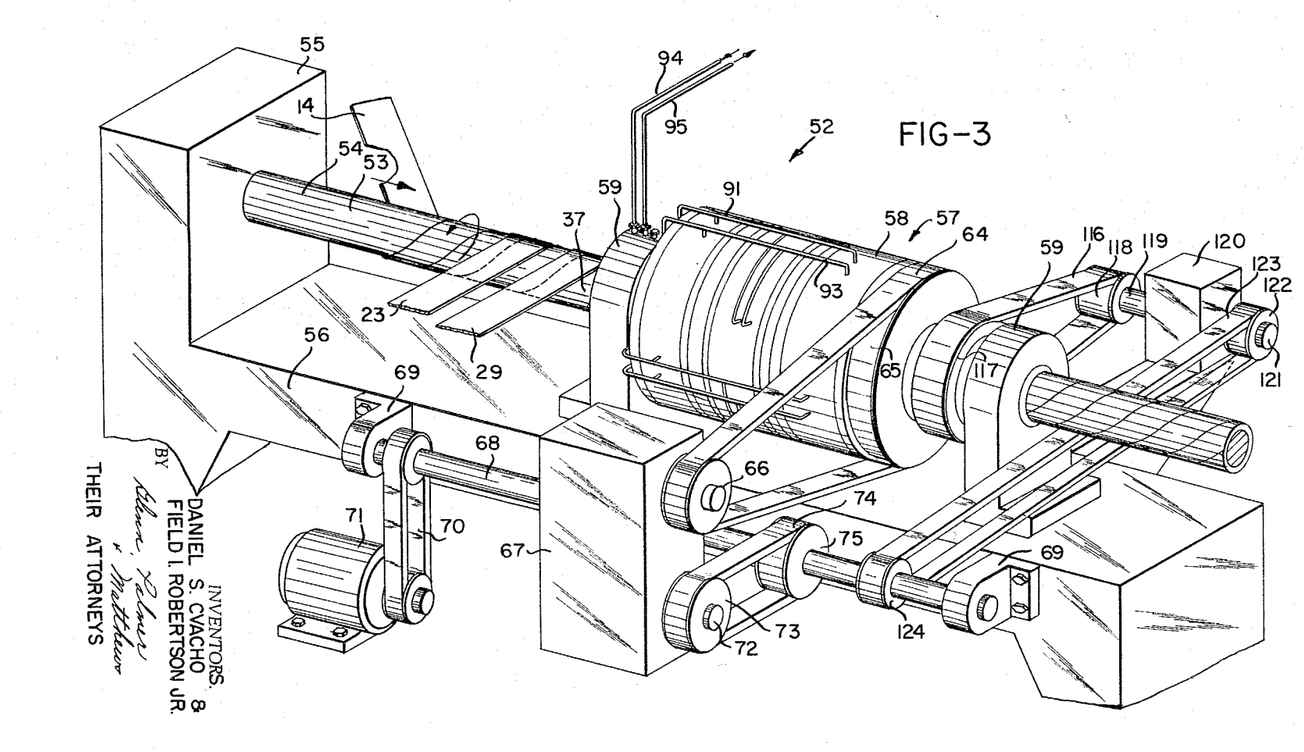

As illustrated in FIGURE 3, the improved method and apparatus of this invention is generally indicated by the reference numeral 52 and comprises a mandrel 53 having one end 54 thereof secured in cantilevered fashion to an outstanding portion 55 of a frame means 56.

The strips of lining material 14, paper board material 23 and labeling or wrapping material 29 are respectively helically wound onto the mandrel 53 in the manner previously described and are drawn from free wheeling supply rolls (not shown) to produce the tubular body stock 37 that is continuously rotated and axially advanced to the right on the mandrel 53 by the apparatus 57 of this invention, the rotating and axially advancing tubular stock 37 being subsequently cut into individual container bodies 39 in any suitable manner after the tubular stock 37 has passed beyond the apparatus 57.

The apparatus 57 of this invention comprises a cage or housing 58 surrounding the mandrel 53 and being rotatably mounted to upstanding portions 59 of the frame means 56.

Figure 8:
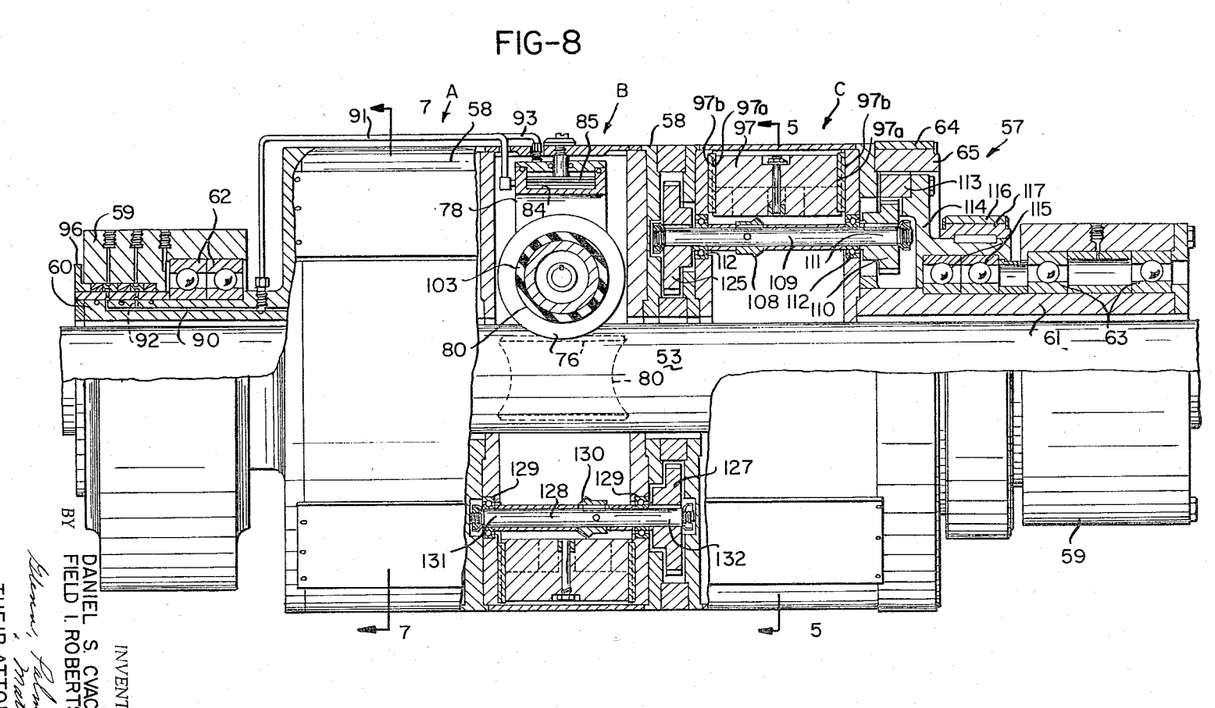
FIGURE 8 is an enlarged, partial cross-sectional view taken substantially on line 8—8 of FIGURE 5.

In particular, reference is made to FIGURE 8 wherein it can be seen that the housing or cage 58 has opposed tubular extensions 60 and 61 adapted to respectively receive the mandrel 53 therethrough and be rotatably mounted in the frame portions 59 by bearing means 62 and 63.

The cage 58 is adapted to be rotated relative to the mandrel 53 by having a drive belt 64 looped about an annular portion 65 of the cage 58 and looped about a pulley 66 carried by a gear box 67 as illustrated in FIGURE 3.

A drive shaft 68 is rotatably carried by bearing means 69 of the frame means 56 and is rotated by a drive pulley 70 driven by an electric motor 71 or the like.

An input shaft 72 extends from the gear box 67 and carries a pulley 73 having a drive belt 74 looped around the same and around a pulley 75 carried by the drive shaft 68.

In this manner, the electric motor 71 is adapted to drive the input shaft 72 of the gear box 67 whereby the gear box 67, through a suitable gear train or the like, is adapted to drive the pulley 66 and thus rotate the cage 58 at the desired speed relative to the mandrel 53 for a purpose hereinafter described.

Figure 4:
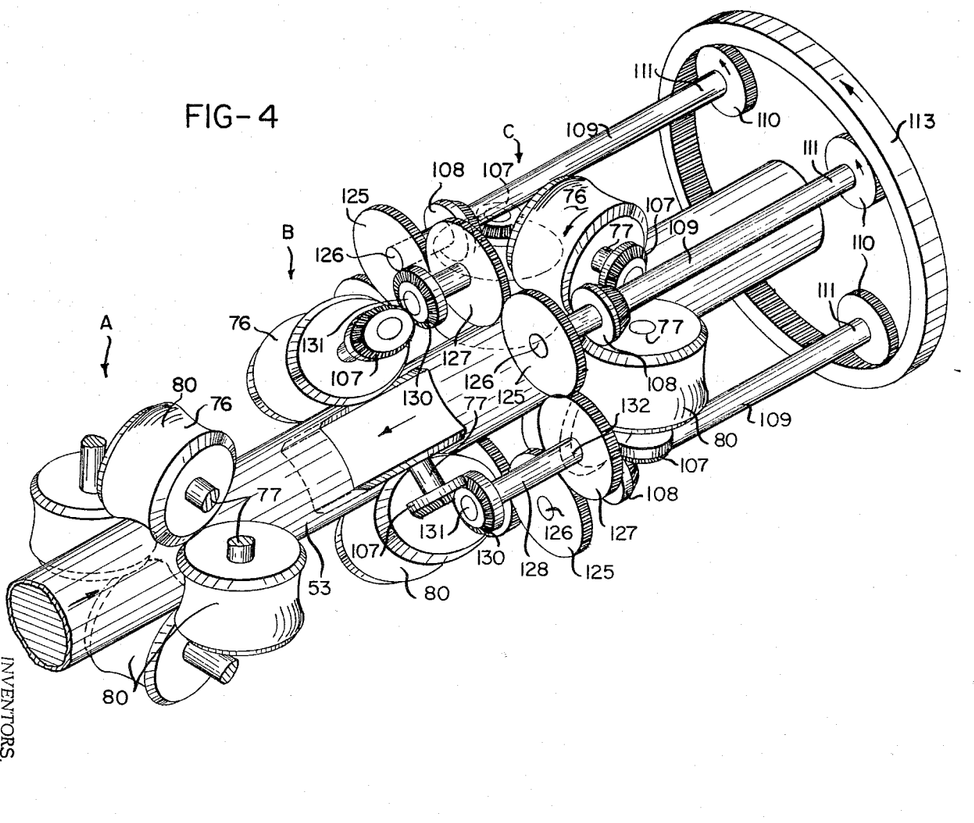
FIGURE 4 is a schematic perspective view illustrating certain of the parts of the apparatus illustrated in FIGURE 3.

As illustrated in FIGURE 4, the cage 58 is adapted to carry a plurality of banks or sets of roller means 76, the roller banks being represented respectively by reference letters A, B and C.

The embodiment of the apparatus 57 illustrated in the drawings provides four rollers 76 for each roller bank A–C, with the rollers 76 in each bank thereof being disposed out of phase with the rollers 76 in an adjacent bank of rollers 76.

For example, the rollers 76 in the roller banks A and C are disposed in a like manner relative to each other, while the rollers 76 in the roller bank B are 45 degrees out of phase with the rollers 76 of the roller banks A and C for a purpose hereinafter described.

While four rollers 76 are illustrated for each roller bank A–C, it is to be understood that two or more rollers 76 can be provided for each bank A–C, as desired.

Figure 5:
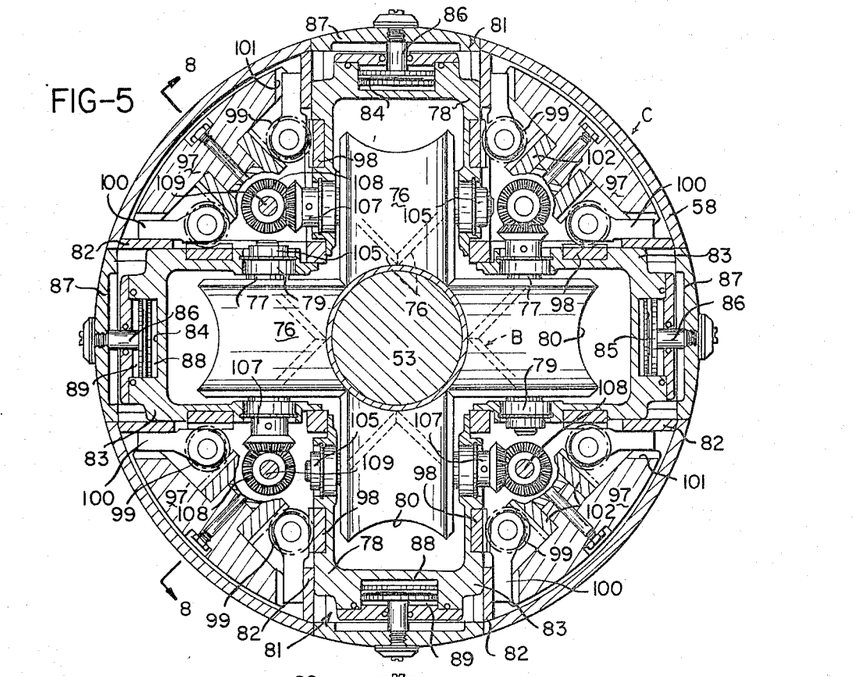
FIGURE 5 is a cross-sectional view taken on line 5—5 of FIGURE 8 with various parts thereof shown in elevation.
Figure 6:
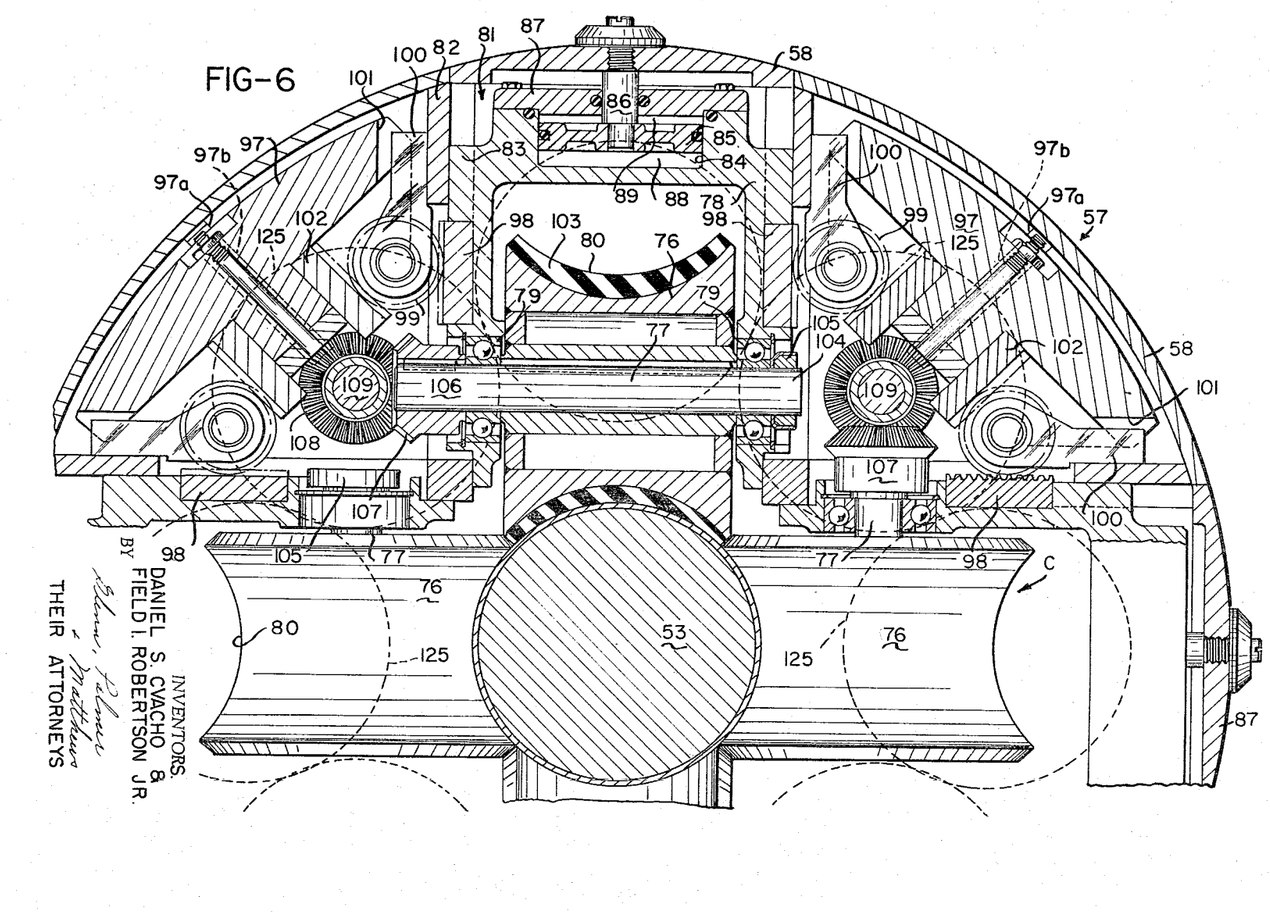
FIGURE 6 is an enlarged, fragmentary cross-sectional view similar to FIGURE 5, with certain of the parts thereof in cross section.
Figure 7:
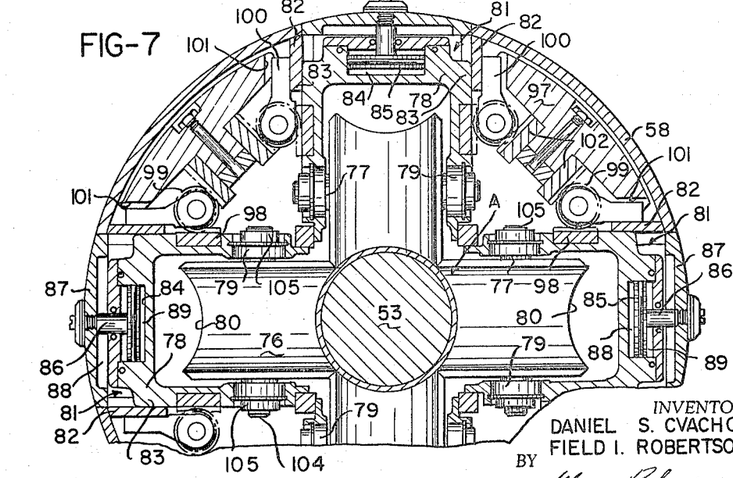
FIGURE 7 is a view similar to FIGURE 5 and is taken on line 7—7 of FIGURE 8.

As illustrated in FIGURES 5, 6 and 7, each roller 76 of the roller banks A–C is mounted on a shaft 77 rotatably mounted in a housing member 78 by bearing means 79, whereby the shaft 77 and its respective roller 76 is adapted to rotate relative to the housing member 78 about an axis disposed transverse to the longitudinal axis of the mandrel 53.

Each roller 76 has an arcuate outer peripheral surface 80 adapted to engage approximately one quarter of the peripheral surface of the tubular stock 37 in the manner illustrated in FIGURES 5, 6 and 7, whereby the four rollers 76 of each bank A–C is adapted to engage the entire circumference of the tubular body stock 37 with the rollers 76 of the roller bank B being adapted to engage any portion of the surface of the tubular stock 37 that is not engaged by the rollers 76 of the roller banks A and C.

The rollers 76 of the roller bank C and the rollers 76 of the roller bank B are mounted and operated in a like manner, except that the rollers 76 in the roller bank B are disposed 45 degrees out of phase with the rollers 76 of the roller bank C, as illustrated in FIGURES 4 and 5, whereby only the description of the various parts for operating the rollers 76 of the roller bank C will be described, but much description also relates to the rollers 76 of the roller bank B, as well as to like parts of the roller bank A, the rollers 76 of the roller banks B and C being adapted to be rotatably driven while the rollers 76 of the bank A are merely free wheeling and not positively driven.

As illustrated in FIGURES 5 and 6, each housing member 78 is mounted for sliding movement in a chamber 81 defined by wall means 82 of the cage 58, each housing member 78 having outwardly directed portions 83 abutting against the walls 82 in a splining relation to prevent cocking of the particular roller 76 about an axis disposed radially to the longitudinal axis of the mandrel 53.

Each housing member 78 has a cylinder portion 84 receiving a fixed piston 85 carried on the end of a shaft 86 projecting through the upper outer wall 87 of the respective housing member 78, the shaft 86 being fixed to the cage 58 for a purpose hereinafter described.

Therefore, it can be seen that the piston 85 of each housing member 78 is adapted to divide the cylinder portion 84 thereof into two chambers 88 and 89.

The chambers 88 of the piston portions 84 of the housing members 78 of the roller banks A–C are adapted to be interconnected to a passage 90 formed in the tubular extension 60 of a cage 58 by conduit means 91, as illustrated in FIGURES 3 and 8.

Similarly, the chambers 89 of the housing members 78 of the roller banks A–C are adapted to be interconnected to a passage 92 in the tubular extension 60 of the cage 58 by conduit means 93.

The passages 90 and 92 in the tubular extension 60 of the cage 58 are adapted to be interconnected to conduits 94 and 95 interconnected to the left-hand upstanding portion 59 of the frame means 56 and be placed in continual communication therewith by valving means 96, even though rotational movement is effected between the upstanding portion 59 and the cage 58.

In this manner, fluid can be directed to the chambers 88 of the housing members 78 while the chambers 89 thereof are interconnected to exhaust means to cause the housing members 78 to be moved radially inwardly toward the mandrel 53 to place the rollers 76 into engagement with the outer peripheral surface of the tubular body stock 37, such engaging force being controlled by the pressure of the fluid being supplied to the chambers 88.

Conversely, the chambers 89 of the housing members 78 can be interconnected to a pressure fluid source and the chambers 88 thereof can be interconnected to exhaust means, whereby the housing members 78 will be moved radially outwardly relative to the mandrel 53 to cause the rollers 76 to disengage from the tubular body stock 37.

Thus, it can be seen that the rollers 76 of the roller banks A–C can be placed into frictional engagement with the outer peripheral surface of the tubular body stock 37 by the cylinder and piston means 84, 85, whereby rotation of the cage 58 by the drive belt 64 causes the roller means 76 to orbit about the mandrel 53 and, through their frictional engagement with the tubular body stock 37, carry the tubular body 37 therewith to cause the tubular body stock 37 to rotate around the mandrel 53 in a desired direction.

Because the cage 58 is rotated at a relatively high speed, the centrifugal force created on the housing members 78 tends to move the housing members 78 radially outwardly to disengage the rollers 76 from the tubular body stock 37.

To overcome such centrifugal force, a plurality of counter weights 97 are provided, a counter weight 97 being disposed between each pair of adjacent rollers 76 in each roller bank A–C.

As illustrated in FIGURES 5–7, each housing member 78 has a pair of opposed racks or gear means 98 fixed thereto and disposed in meshing relation with pinion gears 99 carried by support means 100 fixed to the wall means 82 of the cage 58, the supporting means 100 respectively being disposed in slot means 101 of the counter weights 97 to permit movement of the counter weights 97 relative to the supporting means 100.

Each counter weight 97 is guided for movement relative to the cage 58 by opposed rectangular keys 97a carried by the cage 58 and disposed in slots 97b formed in opposed surfaces of the respective counter weight 97 as illustrated in FIGURES 6 and 8.

Each counter weight 97 carries a pair of opposed racks or gear means 102 respectively disposed in meshing relation with the pinion gears 99.

In this manner, the counter weights 97 are thrown radially outwardly relative to the mandrel 53 as the cage 58 is rotated, whereby the outward movement of the counter weights 97 drive the pinion gears 99 in such a direction that the pinion gears 99 tend to move the housing members 78 radially inwardly to offset the centrifugal force tending to move the housing members 78 radially outwardly.

Thus, counter weights 97 assist the piston and cylinder means 84–85 to maintain the rollers 76 in frictional contact with the tubular body stock 37 during rotation of the cage 58 to cause positive rotation of the tubular body stock 37 relative to the mandrel 53 as the roller means 76 orbit about the mandrel 53 in the above manner.

To increase frictional contact between the roller means 76 and the tubular body stock 37, the outer peripheral surface of each roller means 76 can comprise resilient material 103 or the like.

As previously stated, the roller means 76 of the roller banks B and C are rotatably driven relative to the housing members 78, whereby such rotational movement of the roller means 76, while being in frictional contact with the peripheral surface of the tubular body stock 37, causes the tubular body stock 37 to axially advance to the right on the mandrel 53.

Thus, it can be seen that the rotating and orbiting rollers 76 continuously rotates and axially advances the tubular body stock 37 to the right on the mandrel 53, whereby the strips of material 14, 23 and 29 can be continuously drawn onto the mandrel 53 and form the container body stock 37 in a manner to produce the container body stock 37 without having the adverse surging effects of the prior art crossed belt 40.

The means for rotating the rollers 76 of the roller banks B and C will now be described, and reference is made to FIGURES 5 and 6.

As illustrated in FIGURES 5 and 6, each shaft 77 of each roller 76 has one end 104 thereof provided with a retainer 105 to engage the bearing means 79 and limit axial movement of the shaft 77 in one direction.

The other end 106 of each shaft 77 carries a beveled gear means 107 adapted to limit axial movement of the shaft 77 in the other direction thereof and being disposed in meshing relation with a beveled gear 108 on a shaft 109.

As illustrated in FIGURES 4 and 8, each shaft 109 carries a pinion gear 110 on the end 111 thereof and is rotatably mounted to the cage 58 by bearing means 112.

Each pinion gear 110 is disposed in meshing relation with an internal ring gear 113 carried by a frame means 114 rotatably mounted on the tubular extension 61 of the cage 58 by bearing means 115.

The frame means 114 is adapted to be rotated relative to the cage 58 by a drive belt 116, FIGURES 3 and 8, looped around a pulley portion 117 of the frame means 114 and around a pulley means 118 carried on an output shaft 119 of a gear box 120 carried by the frame means 56.

The gear box 120 has an input shaft 121 carrying a pulley 122 that has a drive belt 123 looped around the same and looped around a pulley 124 carried by the drive shaft 68.

In this manner, the motor 71 not only rotates the cage 58 through the drive belt 64 but also rotates the ring gear 113 through the drive belt 116, whereby the cage 58 and the ring gear 113 can be rotated at different speeds for a purpose hereinafter described.

When the ring gear 113 is rotated in the direction indicated by the arrow in FIGURE 4, the ring gear 113, through the shafts 109, causes the rollers 76 of the roller bank C to rotate in a direction indicated by the arrows to cause axial movement of the tubular body stock 37 to the right on the mandrel 53.

As illustrated in FIGURES 4 and 8, the shafts 109 carry pinion gears 125 on the outer free ends 126 thereof.

A plurality of pinion gears 127 are respectively disposed in meshing relation between adjacent pinion gears 125 and are carried on shafts 128 rotatably mounted in the cage 58 by bearing means 129, FIGURE 8.

Each shaft 128 carries a beveled gear 130 intermediate the ends 131 and 132 thereof, whereby the respective beveled gear 130 is disposed in meshing relation with the beveled gear 107 of a roller means 76 of the roller bank B.

In this manner, the ring gear 113, through the shafts 109 and 128, causes rotation of the rollers 76 of the roller banks B and C in the proper direction to cause axial movement of the container body stock 37 to the right on the mandrel 53, even though the roller means 76 of the roller banks B and C are out of phase with each other and are orbiting about the mandrel 53 by the rotating cage 58.

The operation of the apparatus 52 of this invention will now be described.

As illustrated in FIGURE 3, the strips of material 14, 23 and 29 are angularly fed onto the mandrel 53 to form the container body stock 37, which is adapted to be continuously rotated and axially advanced to the right on the mandrel 53 by the roller means 76. The roller means 76 of the roller banks A–C are urged radially inwardly into frictional engagement with the tubular stock 37 by operation of the cylinder and piston means, 84, 85, in the manner previously described.

Thereafter, the motor means 71 is operated to drive the drive belts 64 and 116 in the proper directions to cause the cage 58 to rotate relative to the mandrel 53 and the ring gear 113 to rotate in the proper direction to rotate the rollers 76 of the roller banks B and C and cause axial movement of the tubular stock 37 to the right on the mandrel 53, while the rotating cage 58 orbits the roller means 76 of the roller banks A–C about the mandrel 53 to rotate the tubular stock 37 relative to the mandrel 53.

While only one size of roller means 76 has been illustrated, it is to be understood that the apparatus 57 of this invention can be utilized to form larger or smaller diameter tubular stock 37 by merely changing the size of the rollers 76 as well as the counter weights 97.

Further, the widths of the strips 14, 23 and 29 can vary and the angular feed thereof can vary by merely varying the speed of rotation of the cage 58 and speed of rotation of the ring gear 113 to produce tubular stock 37 of the desired size.

During normal practice, slip material is either placed on the mandrel 53 or coated on the under surface of the strip of material 14 or a separate sheet of slip material is utilized to facilitate rotational and axial movement of the tubular stock 37 relative to the mandrel 53.

However, while the mandrel 53 of this invention has been illustrated as being stationary, it is to be understood that the same could be made rotatable relative to the frame means 56 by providing suitable drive means to rotate the mandrel 53 relative to the frame means 56.

In this manner, the rotation of the mandrel 53 would also tend to reduce the friction between the rotating and axially advancing tubular stock 37 and the exterior peripheral surface of the mandrel 53, whereby such aforementioned slip material could be eliminated or utilized in combination therewith, it being understood that the mandrel 53 is rotated at a speed other than at the speed of rotation of the cage 58.

Therefore, it can be seen that this invention provides an improved method and apparatus for rotating and/or axially advancing tubular stock as well as an improved method and apparatus for continuously making tubular stock or the like.

In addition, it can be seen that as the tubular stock 37 rotates and axially advances on the mandrel 53 past the apparatus 57, the rollers 76 engage all portions of the tubular stock 37 and push the same radially inwardly against the mandrel 53, whereby the tubular stock 37 is more securely laminated together than by the prior known crossed belt because the method and apparatus of this invention compacts the various strips of material together around the entire periphery of the tubular stock.

While the form of the invention now preferred has been disclosed as required by the statutes, other forms may be used, all coming within the scope of the claims which follow.

What is claimed is:

1. In combination, a mandrel, means for angularly feeding at least one strip of material onto said mandrel to form tubular stock, a rotatable cage surrounding said tubular stock, a plurality of roller means carried by said cage and adapted to engage said tubular stock, said roller means being adapted to move radially relative to said cage, movable weight means carried by said cage, said weight means being respectively disposed between adjacent roller means and being operatively interconnected thereto to move said adjacent roller means radially inwardly as said weight means moves radially outwardly, and means for rotating said cage to tend to force said weight means radially outwardly whereby said roller means are urged into engagement with said tubular stock to rotate said tubular stock.

2. A combination as set forth in claim 1 wherein each roller means carries opposed rack means, each weight means carries opposed rack means, and said cage carries gear means respectively disposed in meshing relation with said rack means of said roller means and said weight means.

3. In combination, a mandrel, means for angularly feeding at least one strip of material onto said mandrel to form tubular stock, a plurality of sets of roller means engaging said tubular stock, each set of roller means being axially spaced from its adjacent set of roller means and being out of phase therewith, means operatively interconnecting one set of roller means with another set of roller means whereby rotation of said roller means of said one set causes like rotation of said roller means of said other set, and means for rotating said roller means of said one set to cause said other roller means to rotate and axially advance said tubular stock on said mandrel.

4. A combination as set forth in claim 3 wherein each roller means of said one set causes like rotation of a roller means of said other set.

5. A combination as set forth in claim 3 wherein means are provided for orbiting said rotating roller means around said mandrel to rotate said tubular stock relative to said mandrel.

6. A combination as set forth in claim 3 wherein said roller means engage the entire periphery of said tubular stock before said tubular stock passes beyond said roller means.

7. Apparatus for rotating and axially advancing tubular stock or the like comprising a plurality of sets of roller means for engaging said tubular stock, each set of roller means being axially spaced from its adjacent set of roller means and being out of phase therewith, means operatively interconnecting one set of roller means with another set of roller means whereby rotation of said roller means of said one set causes like rotation of said roller means of said other set, and means for rotating said roller means of said one set to cause said roller means to rotate and axially advance said tubular stock.

8. Apparatus as set forth in claim 7 wherein each roller means of said one set causes like rotation of a roller means of said other set.

9. Apparatus as set forth in claim 7 wherein means are provided for orbiting said rotating roller means to rotate said tubular stock.

10. Apparatus as set forth in claim 7 wherein said roller means are adapted to engage the entire periphery of said tubular stock.

References Cited by the Examiner

UNITED STATES PATENTS

| | | | |
|---|---|---|---|
| 549,667 | 11/1895 | Denney | 93—80 |
| 1,625,471 | 4/1927 | Jauch | 93—80 |
| 1,872,152 | 8/1932 | Maltby | 93—80 |
| 2,112,396 | 3/1938 | Corrigan | 82—63 |
| 2,321,738 | 6/1943 | Farny | 93—80 |
| 2,619,174 | 11/1952 | Neale | 82—63 |
| 2,723,605 | 11/1955 | Stahl | 93—80 |
| 3,029,674 | 4/1962 | Southwell et al. | 82—63 |
| 3,102,458 | 9/1963 | Schur | 93—80 |

BERNARD STICKNEY, *Primary Examiner.*

FRANK E. BAILEY, H. WHITEHEAD,
        *Assistant Examiners.*